(12) United States Patent
Ely et al.

(10) Patent No.: US 7,716,381 B2
(45) Date of Patent: May 11, 2010

(54) METHOD FOR TRACKING AND STORING TIME TO COMPLETE AND AVERAGE COMPLETION TIME FOR STORAGE AREA NETWORK I/O COMMANDS

(75) Inventors: Paul Andrew Ely, Costa Mesa, CA (US); Bino Joseph Sebastian, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 170 days.

(21) Appl. No.: 11/360,557

(22) Filed: Feb. 22, 2006

(65) Prior Publication Data
US 2007/0208849 A1 Sep. 6, 2007

(51) Int. Cl.
*G06F 3/00* (2006.01)
*G06F 13/42* (2006.01)
(52) U.S. Cl. .............................. 710/5; 710/58; 710/105
(58) Field of Classification Search .................. 710/5, 710/105, 58
See application file for complete search history.

(56) References Cited

U.S. PATENT DOCUMENTS

| 6,026,425 | A  * | 2/2000 | Suguri et al. ................. 718/105 |
| 6,421,723 | B1 * | 7/2002 | Tawil ........................... 709/224 |
| 6,950,888 | B1 * | 9/2005 | Rooney et al. ................ 710/58 |
| 2009/0259749 | A1 | 10/2009 | Barrett et al. | |

* cited by examiner

*Primary Examiner*—Henry W. H. Tsai
*Assistant Examiner*—Juanito C Borromeo
(74) *Attorney, Agent, or Firm*—Morrison & Foerster LLP

(57) ABSTRACT

Embodiments of the present invention are directed to providing continuously updated completion time and an average completion time information for I/O commands on a per-LU, per-target, per-port basis. This measurement is performed by a kernel device driver that handles the I/O for the system at lower layers, so the measurements are more accurate because the delays due to higher level processing are not included. This approach allows the driver to track movements in the average I/O command completion time per LU and limit outstanding I/O counts early enough to potentially prevent overload conditions. By catching the overload early, the invention also has the ability to restore the original outstanding I/O count as the overload condition subsides.

47 Claims, 3 Drawing Sheets

METHOD FOR TRACKING AND STORING TIME TO COMPLETE AND AVERAGE COMPLETION TIME FOR STORAGE AREA NETWORK I/O COMMANDS

FIELD OF THE INVENTION

This invention relates to the processing of Input/Output (I/O) commands across a Storage Area Network (SAN), and more particularly, to the determination of I/O command completion times and average I/O command completion times per logical drive in a SAN to enable optimization of storage allocations and improve I/O command completion times.

BACKGROUND OF THE INVENTION

In today's increasingly data-driven and competitive business environment, the efficient storage and retrieval of data is often critical to business success. The use of SANs has become widespread as the ability to store and retrieve massive amounts of data from a large number of storage devices over a large geographic area is now becoming a business necessity. Not surprisingly, reducing the time it takes to store and retrieve data across a SAN is a goal of any such storage system.

FIG. 1 illustrates an exemplary conventional SAN 100 including a host computer 102, a fabric 104, a target 106 and one or more Logical Units (LUs) 108, which are actually logical drives partitioned from one or more physical disk drives controlled by the target's array controller. The host computer 102 includes an initiator 110 such as a Host Bus Adapter (HBA) or I/O controller for communicating over the SAN 100. A representative application 112 is shown running on the host computer 102. The fabric 104 may implement the Fibre Channel (FC) transport protocol for enabling communications between one or more initiators 110 and one or more targets 106. The target 106 acts as a front end for the LUs 108, and may be a target array (a single controller with one or more ports for managing, controlling access to and formatting of LUs), Just a Bunch Of Disks (a JBOD) (a collection of physical disks configured in a loop, where each disk is a single target and a LU), a Switched Bunch Of Disks (SBOD®), or the like. An example of a conventional target array is an EMC Symmetrix® storage system or an IBM Shark storage system.

In the example of FIG. 1, the application 112 may employ a file system protocol and may initiate read or write I/O commands 114 that are sent out of the host 102 through the initiator 110 and over the fabric 104 to target 106, where data may be read from or written to one or more of the LUs 108. When an I/O command 114 is transmitted, there is an expectation that the I/O command will be completed, and that it will be completed within a certain period of time. If the read or write operation is completed successfully, an I/O command completion notification 116 will be delivered back to the application 112. At other times, however, if a target 106 or LU 108 is overloaded or malfunctioning, the I/O command may not complete, and no I/O command completion notification 116 will be sent back to the application 112. In such a situation, the only feedback received by the application 112 may be an indication that the I/O command timed-out, and a reason code providing a reason for the timeout.

To assist a SAN system administrator in identifying problem targets 106 or LUs 108 and maintaining an efficient SAN with a balanced and fair LU workload, it is desirable to know the average I/O command completion time for I/O commands sent to each LU 108 in a target 106. In particular, it would be desirable for a system administrator to receive continuously updated LU-specific average I/O command completion time information for each LU in each target the initiator discovered in a dynamic manner. Such information would enable the system administrator to identify where latencies are being injected into the SAN or identify latencies that are worsening, and make adjustments accordingly. For example, if the average I/O command completion times for two different LUs 108 in the same target 106 are drastically different (e.g. greater than one second), this may be an indication that the LUs are unbalanced and that there is some unfairness at the target, and that perhaps the LU loads need to be re-balanced to achieve a greater degree of fairness. On the other hand, if the average I/O command completion times for all LUs 108 at a target 106 are high, this may be an indication that the target is receiving too many I/O requests and that more storage needs to be added so that some data can be shifted to the new target. In other words, it is desirable for the application to detect unfairness among LUs and/or overloaded conditions at a particular target.

However, conventional fabric-attached storage solutions do not provide average I/O command completion time information for an initiator 110 and target 106 in a SAN 100, or for multiple initiators and targets in a SAN. Conventional systems either do nothing, or wait for an initial I/O command failure to occur before taking corrective action such as limiting the outstanding I/O count. The problem with this approach is that by the time the storage device provides an indication that a problem exists, it may be too late to influence the storage device or it may become very expensive to react from an application point of view.

It should be noted that for directly attached and controlled storage such as conventional parallel Small Computer System Interconnect (SCSI) systems where the storage is directly connected to the host without an intervening target array, tools do exist for calculating the I/O command completion time for a particular I/O command and an average I/O command completion time, such as iostat -v, sysstat version 5.0.5, ©Sebastien Godard, the contents of which are incorporated by reference herein. In such systems, a statistics counter in the SCSI layer keeps track of I/O command completion times, and monitoring tools within the operating system display this parameter. However, the average I/O command completion time is merely an information-only health indicator, because directly-attached storage systems by their very nature cannot make use of this information to adjust storage allocations and improve the response times of I/O commands.

Therefore, there is a need to compute average I/O command completion times on a per-LU, per-target basis within a fabric-attached storage system to enable a driver within a host, or a system administrator, to make adjustments to improve the efficiency of the SAN.

SUMMARY OF THE INVENTION

Embodiments of the present invention are directed to providing continuously updated completion time and an average completion time information for I/O commands on a per-LU, per-target, per-port basis. This measurement is performed by a kernel device driver that handles the I/O for the system at lower layers,-so the measurements are more accurate because the delays due to higher level processing are not included. This approach allows the driver to track movements in the average I/O command completion time per LU and limit outstanding I/O counts early enough to potentially prevent overload conditions. By catching the overload early, the invention also has the ability to restore the original outstanding I/O count as the overload condition subsides. Emulex Corporation's HBAnyware™ HBA management suite can also be used to poll the average completion time and other information from the driver of each host so that a system administrator can see all of this information for the entire SAN and make adjustments accordingly.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

It should further be understood that although embodiments of the present invention are described herein in terms of SCSI upper layer transport protocols and FC lower layer transport protocols for purposes of illustration only, embodiments of the present invention are applicable to other upper and lower layer transport protocols. Note also that embodiments of the present invention are not limited to fabric-attached storage, but apply to any SAN topology discoverable by the present invention, be it hub-based, arbitrated-loop based, or fabric based.

Figure 1:
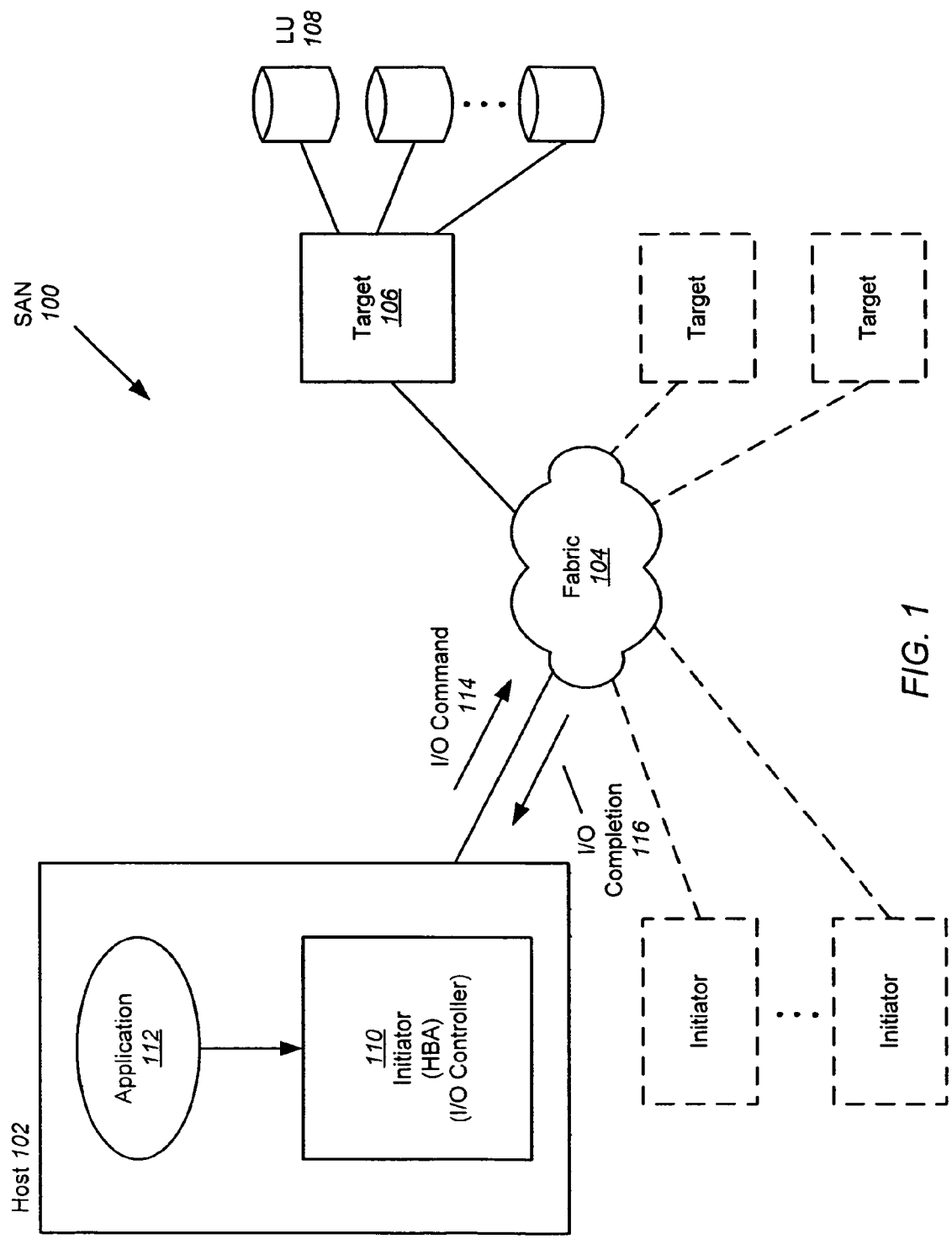
FIG. 1 illustrates an exemplary conventional SAN including an initiator for sending an I/O command, a fabric, and a target for the I/O command including one or more LUs.
Figure 2:
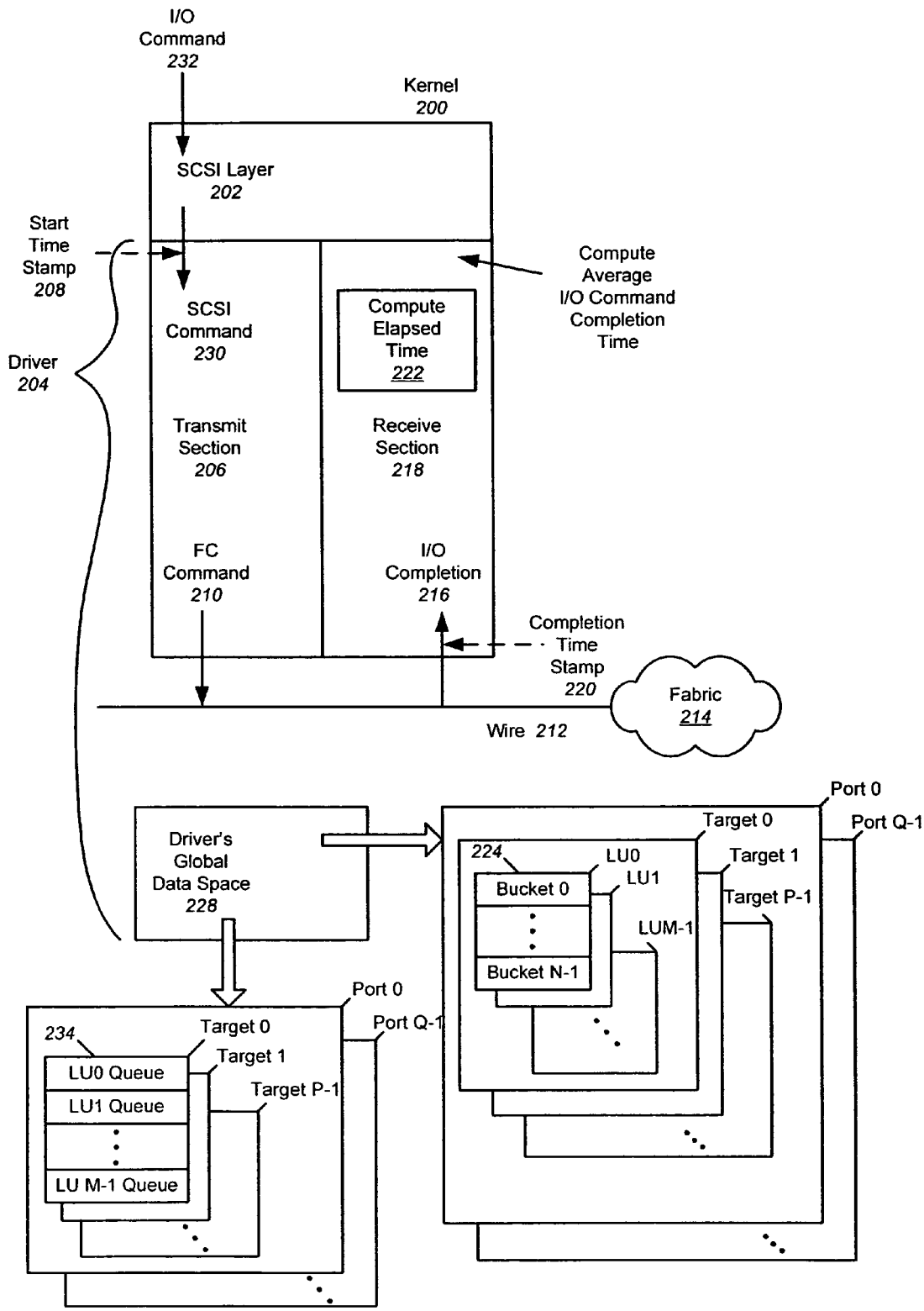
FIG. 2 illustrates an exemplary kernel within a host computer for determining I/O command completion times according to embodiments of the present invention.

FIG. 2 illustrates an exemplary kernel 200 within a host computer for computing I/O command completion times and average I/O command completion times according to embodiments of the present invention. The kernel 200 is the essential center of the host operating system, the core that provides basic services for all other parts of the operating system. The kernel 200 may include an upper transport protocol layer such as SCSI layer 202 and a lower transport protocol driver layer 204. The driver 204 may include a transmit section 206, a receive section 218, and global data space 228. The driver's global data space 228 may store driver configuration data, buckets 224 for each LU, and a queue 234 for each LU, described in further detail below.

Every time an I/O controller port is discovered, the host operating system calls the driver 204, which allocates a block of storage or data structure within its global data space 228 representing that port instance, and assigns a target pointer to that block of storage. Because an I/O controller may contain more than one port, and the driver maps each I/O port to a target, the driver monitors multi-ported I/O controllers the same as single-port I/O controllers. This approach maintains target/port independence. In other words, the driver does not try to figure out whether two or more targets belong to a single I/O controller. FC discovery provides for target discovery only, and targets are not subordinate to each other. Therefore a multi-port array looks like multiple targets to the driver's discovery engine, just like a JBOD with four disks is discovered as four targets. Embodiments of the present invention track this raw data just the same, allowing upper layer applications to "link" target/LU disturbances together with additional knowledge of the SAN topology.

To compute average completion time on a per-LU, per-target and per port basis, the driver 204 must store statistics about the completion times for a number of I/O command completions on a per-LU, per-target, per-port basis. Therefore, in embodiments of the present invention, the driver may allocate "buckets" (memory locations) within its global data space 228 for storing a count of the number of I/O commands that completed within a particular range of time. For example, one bucket may keep track of the number of I/O commands that took between 0.0 and 10.0 ms to complete, another bucket may keep track of the number-of I/O commands that took between 10.0 and 20.0 ms to complete, another bucket may keep track of the number of I/O commands that took between 20.0 and 30.0 ms to complete, and so on. Bucket sizes may be fixed by the driver 204, or may be specified by the system administrator when the driver is loaded. Each bucket 224 corresponds to a particular LU, target and port. In the example of FIG. 2, N buckets are allocated for each of M LUs, and this two-dimensional array may be repeated for P targets and Q ports. Thus, a three-dimensional per-LU, per-target, per-port histogram array is stored in the driver's global data space 228.

The buckets 224 are accumulators, so they are not normally reset. Eventually, they may wrap back to zero, so embodiments of the present invention may keep track of when the count in each bucket wraps around. For example, if the total count in an N-bit bucket is $2^N$, and it has wrapped twice, the driver must recognize that the count in the bucket is $2 \times 2^N$ plus whatever count is in the bucket at the time the computation is performed. One way that wrapping could be estimated is to keep track of the previous count and compare it to the new count. If the new count is lower, then it is assumed that the bucket count wrapped once. Alternatively, the driver could reset the bucket counts when an overflow condition is encountered, or the driver could issue a signal or trap to the application indicating an overflow, and the application could initiate a reset.

In the example of FIG. 2, I/O commands 232 from an application being executed by the host are received by the upper SCSI layer 202 (see block 300 of FIG. 3) and passed down to the transmit section 206 of driver 204 as SCSI commands 230. The transmit section 206 time stamps a start time of the SCSI command 230 (see reference character 208 in FIG. 2 and block 302 in FIG. 3) and embeds the time stamp into a transport protocol data structure such as a FC command 210 that encapsulates the SCSI command. The FC command 210 is then sent out over wiring 212 to the FC fabric 214 (see block 304 in FIG. 3). Note that "wiring," as referred to herein, is intended to encompass any transmission media, including copper, fiber, and other media. However, it should be noted that the timestamp does not go out on the wiring 212. The FC command 210 that encapsulates the SCSI command and timestamp includes some data fields (including the timestamp field) that do not leave the kernel memory allocated and managed by the driver. When an I/O command completion 216 representing the completion of the original SCSI command is received from the fabric 214 in the receive section 218 of the driver 204 (see block 306 in FIG. 3), the receive section 218 fetches and records the completion time 220 at which the I/O command completion 216 was received (see block 308 in FIG. 3). The receive section 218 then computes an elapsed I/O command completion time (net round trip completion time from transmit to receive) 222 based on the difference between the timestamped SCSI command start time 208 extracted from within the I/O command completion 216 and the recorded completion time 220 (see block 308 in FIG. 3). Every time an I/O command completion time 222 is computed for a particular LU and port, the count in the appropriate bucket 224 (based on the I/O completion time) is incremented (see block 310 in FIG. 3). The buckets therefore maintain a count of the number of I/O commands completed and a distribution of all completion times. The count in the buckets may form a bell curve, and can be used to compute an average I/O command completion time for a particular LU.

The I/O command completion time measurement is based on a clock in the host, and utilizes high resolution timers in the operating system that resolve to milliseconds at least. Thus, at a relatively low layer in the host, the driver 204 keeps track of the time from when the driver sent an I/O command to the time it receives an acknowledgement of the completion of that I/O command, all the way back through the network from the LU. In other words, it is the entire round trip time from the driver's perspective.

Note that unlike conventional directly attached storage implementations, which measure I/O command completion times at higher layers in the protocol stack, the I/O command completion time measurement according to embodiments of the present invention is performed by the lower transport protocol driver layer 204. In particular, embodiments of the present invention track the I/O command completion times in the driver 204 from the time the SCSI layer 202 gives the SCSI command 230 to the driver to the time the driver receives the I/O completion 216. The I/O command completion times therefore take into account all of the transport layer latency and overhead without injecting continued SCSI layer file system application thread transitions to user space into the completion time. The measurements are more accurate because the delays due to higher level processing are not included.

Figure 3:
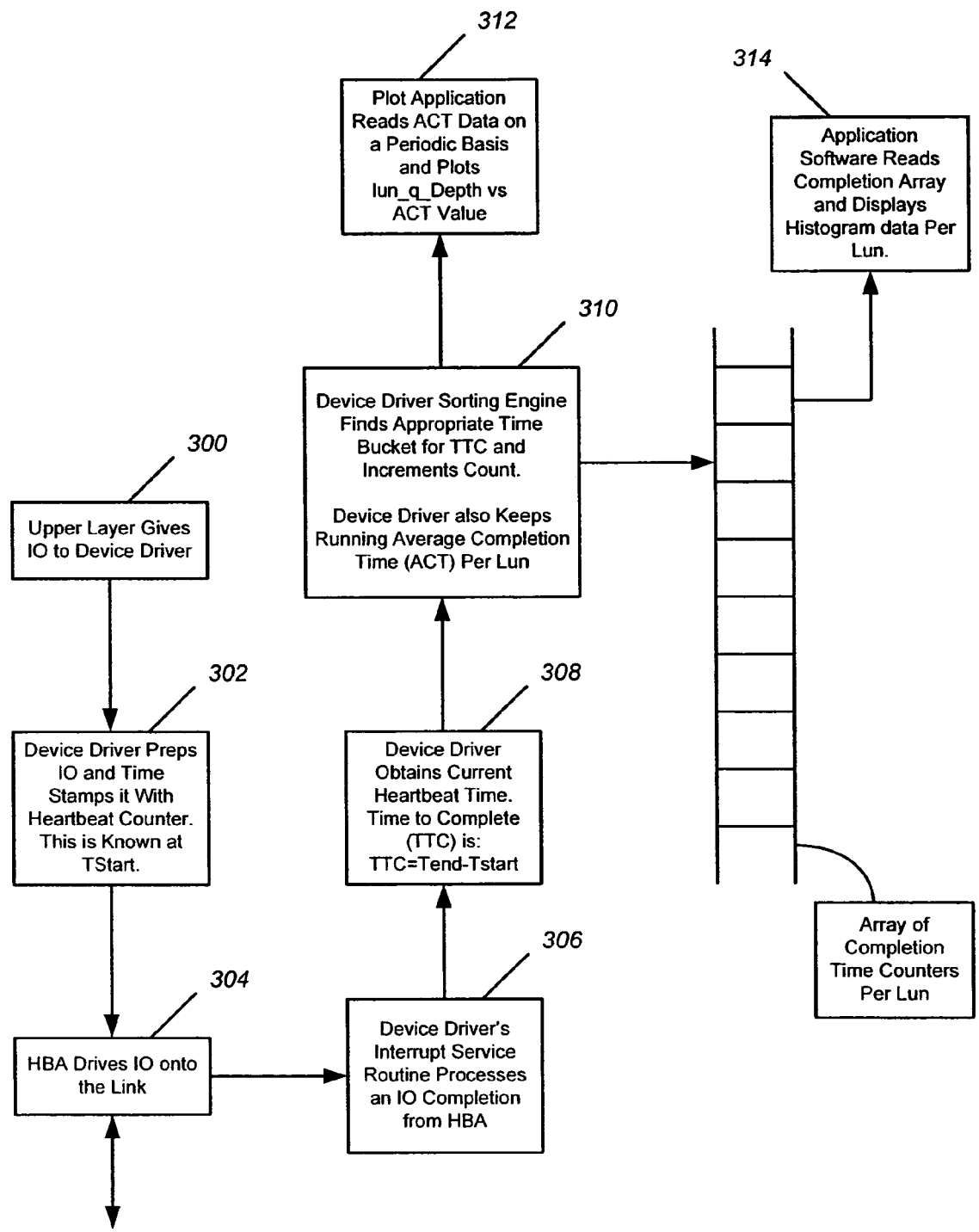
FIG. 3 illustrates an exemplary flowchart describing the determination of I/O command completion times according to embodiments of the present invention.

Once an I/O command completion time has been computed and the appropriate bucket has been incremented, the receive section 218 may then compute an updated average I/O command completion time for the particular LU and port (see block 310 in FIG. 3). The average I/O command completion time for a LU can be computed by multiplying the average I/O command completion time represented by a particular bucket 224 by the count in each bucket (e.g. a 0-10 ms bucket with a count of 10 would be 5 ms×10=50 ms). The product of each multiplication for each bucket associated with that LU is then summed. The sum is then divided by the sum of the counts in all of the buckets for that LU to produce the average I/O command completion time for that LU. This computation is repeated for all LUs in each target and for all ports.

Alternatively, raw data such as the bucket counts may be sent to a higher layer, and the computation of average I/O command completion times may be performed at this higher layer. The buckets and/or average I/O command completion times may also be made available to upper layer applications for display to system administrators via a host-provided API. This host-provided API typically receives data at its bottom edge from the driver while exporting a callable interface at its top edge for applications. The data may also be used to make histogram plots that aid in early warning detection and usage patterns on the storage device (see block 312 in FIG. 3). In addition, if a higher level application wants to read the histogram data, it may request a target 1 pairing, and the driver would index into its private data structure, access it in its entirety, and return it back up to the application (see block 314 in FIG. 3).

In conventional systems, system administrators may wish to limit the storage system's configuration in advance of an overload (e.g. dropped I/O commands) to prevent overload from ever occurring. Overloading is an indication of an oversubscribed target. However, in conventional systems this must be done without the assistance of any monitoring data. Utilizing embodiments of the present invention, that effort could be reduced as each system communicating with the storage device would automatically detect average I/O command completion time trend increases and throttle back the outstanding I/O commands for each LU in a target. In particular, after the average I/O command completion time information is computed and stored, the information may be evaluated by the driver to determine if certain conditions exist that require automatic intervention. For example, embodiments of the present invention may detect overloading (average I/O command completion time for a LU approaching an upper limit, or I/O commands failing altogether). This upper limit may represent a predetermined time interval from a maximum allowable I/O command completion time specified by the upper layers, both of which may be a default value that may also be configurable by the system administrator.

As mentioned above, a queue 234 may be maintained in the driver's global data space 228 for each LU in each target for each port. This queue 234 holds outstanding (pending and incomplete) I/O commands for that LU. The depth of the queue 234 may be controllable at the SCSI layer of the initiator. Adjusting the queue depth serves to control the number of outstanding I/O commands for each LU.

In embodiments of the present invention, the receive section 218 may not only generate per-LU average I/O command completion times, as described above, but may also be able to do something with it, such as throttling back the per-LU queue depth. For example, suppose that the receive section 218 detects that a LU's average I/O command completion time is moving out too far (increasing over time towards the upper limit). Upon detecting an average I/O command completion time that is in danger of increasing beyond this upper limit, the driver's receive section 218 can upcall the midlayer (call into the operating system), and from the SCSI layer 202, lower the number of outstanding I/O commands to that LU by reducing the queue depth for that LU (by half, for example), until the LU recovers, as indicated by a reduction in the average I/O command completion time. The amount that the queue depth is lowered may be configurable by the system administrator. The effect of lowering the maximum number of incomplete I/O commands is that it increases the probability that the LU will actually respond and complete the I/O commands because it is not as overloaded. There is a better chance that the LU will complete the I/O commands rather than having them timeout and require error handling from activating in the upper layers of the system. In addition, multipathing configurations benefit from timely completion of I/O commands rather than error handling as multipathing configurations typically have to maintain command retry state that pressures system resources.

Alternatively, the queue depth can be lowered for all LUs in the target. This blanket approach serves to protect against the starvation of LUs and provide fairness to all LUs so that LUs with a high number of I/O command completions are throttled as well as those LUs that are starved. If, after lowering the queue depth for all LUs, the average I/O command completion time for a particular LU is still too high, the queue depth for all LUs in the target can be repeatedly lowered, as necessary, until a lower limit is reached. The lower limit, which may be configurable by the system administrator, is preferable as opposed to lowering the allowable number of outstanding I/O requests to reach zero because it is desirable to have some amount of I/O commands queued up so it is possible to evaluate how well the LU is doing. If the condition causing the high average I/O command completion time is transient, the LU will recover quickly. If the condition is more continuous in nature, the LU will recover slowly, or may not recover at all.

If the average I/O command completion time starts to improve (drop) to some acceptable threshold, the driver can automatically perform step increases to the LU queue depth for all LUs in the target. The queue depth can eventually be raised until it is back to the initial depth that the driver was initialized with. The step increases may be configurable by the driver, and are useful to prevent overload conditions from being reintroduced if the condition causing the high average I/O command completion times is continuous in nature.

If the array does not recover even after the corrections, the target may simply be oversubscribed, and it may be necessary to expand the number of LUs in the target, or redirect some of the data out to a new target. Being oversubscribed is relative—cutting the queue depth in half even once may be an indication that the storage array is oversubscribed, or a system administrator may not consider the storage array to be oversubscribed until the queue depth has been dropped to the lower limit without improvement in the average I/O command completion time. Adding LUs or redirecting data to a new target would have to be performed manually by the system administrator.

The average I/O command completion time is not the only statistic that may be used to determine what is occurring to the LUs within a target. For example, if there is a large disparity between the average I/O command completion times of LUs in the same target, this is an indication of starvation (unfairness in the average I/O command completion times for LUs within a target). Starvation usually applies to a few LUs out of many, and occurs due to unfairness of the I/O scheduler in the operating system, above the driver. However, the driver is not in control of fairness in terms of I/O scheduling, and thus can only detect a lack of fairness, not restore it. Changing fairness is something that the system administrator must do manually.

The counts in the individual buckets may also provide an indication of what is happening within a LU. For example, a bell curve centered at a particular average I/O command completion time may be expected, but if there is a spike at some unexpected completion time, this may indicate a specific problem requiring LU maintenance. In other words, the nature of the distribution of counts in the buckets for a LU may provide an indication of what is happening in the LU, and more generally, what is happening at the target level, which is what the FC transport protocol cares about. (The application cares about the LU level.) Again, any adjustments made as a result of the nature of the distribution of counts in the buckets for a LU must be made manually by the system administrator.

In addition, if a LU isn't as available as other LUs, as evidenced by a high average I/O command completion time for that LU as compared to other LUs, other LUs with a-higher limit should be used. However, a system administrator would have to manually intervene and make a decision to change the storage allocation and/or move data from one LU to another.

The invention can be extended to multiple initiators and multiple targets. Statistics can be obtained for all initiators and all targets so that a system administrator can determine which targets are overloaded and which initiators are affected. In other words, it can be extended across the entire SAN. All existing tools do not and cannot have this extension capability because they are all applicable only to direct attached storage.

A system administrator may want to work from a single terminal on a single host and evaluate I/O command completion time data for all hosts in the SAN and all of the LUs, targets and ports in the SAN. Emulex Corporation's HBAnyware™ management suite, in its current configuration, keeps track of how HBAs are performing, how they are configured, enables HBAs to be configured remotely, and allows reports to be sent to remote locations on the network. HBAnyware™ can be extended in view of embodiments of the present invention to poll the average I/O command completion time and other information from the driver of each host within which HBAnyware™ is running and present it to the system administrator at a remote location in graphical or tabular form as described above so that a system administrator can see all of this LU loading information for the entire SAN and make adjustments accordingly. HBAnyware™ has a routine running in each driver that reports back, in-band, to the host within which the HBAnyware™ software is running. HBAnyware™ can communicate with all of the HBAs on each host, collect the data for each of the buckets for each LU, and send this data back to the host within which the HBAnyware™ software is running.

In addition, instead of having the driver detect an increasing average I/O command completion time and an upcoming overload condition and set the queue depth automatically, the adjustments to the queue depths could also be done by a system administrator using HBAnyware™ and communicated back to each of the drivers.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a Storage Area Network (SAN), a method for continuously providing Input/Output completion information for a particular logical drive, comprising:

timestamping an I/O command destined for the particular logical drive with a first time prior to transmission of the I/O command across the SAN;

recording a second time when an I/O completion is received from the SAN;

calculating an I/O command completion time by computing a time difference between the first time and the second time;

determining a particular range of time that the calculated I/O command completion time falls within;

identifying a bucket representing the particular range of time from a plurality of buckets associated with the particular logical drive each bucket representing a unique range of time and containing a count of I/O commands destined for the particular logical drive that are completed within the range of time represented by the bucket;

incrementing the count of I/O commands within the identified bucket;

calculating an average I/O command completion time for the particular logical drive based on the plurality of buckets and counts contained therein; and increasing or decreasing a number of outstanding I/O commands associated with the particular logical drive based on the calculated average I/O command completion time as compared to a pre-determined threshold.

2. The method as recited in claim 1, wherein calculating an average I/O command completion time for the particular logical drive further comprises:
multiplying an average of the range of time represented by each bucket associated with the logical drive by the count within each bucket to generate a first product;
summing the first products for each bucket to generate a first sum;
summing the counts within each bucket to generate a second sum; and
dividing the first sum by the second sum.

3. The method as recited in claim 1, wherein the method is performed at a lower transport protocol driver layer.

4. The method as recited in claim 2, further comprising:
sending the bucket counts to a higher layer; and
calculating the average I/O command completion time at the higher layer.

5. The method as recited in claim 1, further comprising determining the I/O command completion time and the average I/O command completion time for I/O commands destined for any logical drive in a target.

6. The method as recited in claim 5, further comprising automatically decreasing a number of allowable outstanding I/O commands to each logical drive in a target upon detecting that the average I/O completion time for any logical drive in that target has reached an upper limit.

7. The method as recited in claim 6, further comprising decreasing the number of allowable outstanding I/O commands to each logical drive by decreasing a queue depth for each logical drive.

8. The method as recited in claim 6, further comprising decreasing the number of allowable outstanding I/O commands to each logical drive by a configurable amount.

9. The method as recited in claim 8, further comprising automatically repeatedly decreasing the number of allowable outstanding I/O commands by the configurable amount until the average I/O completion time for the logical drive in the target that had reached the upper limit decreases.

10. The method as recited in claim 9, wherein the number of allowable outstanding I/O commands to each logical drive is not decreased below a configurable non-zero lower limit.

11. The method as recited in claim 6, further comprising automatically increasing the number of allowable outstanding I/O commands to each logical drive in the target upon detecting that the average I/O completion time for any logical drive in that target has decreased to a particular threshold.

12. The method as recited in claim 11, wherein the number of allowable outstanding I/O commands to each logical drive is increased in configurable steps.

13. The method as recited in claim 1, further comprising embedding the first time into a transport protocol command.

14. The method as recited in claim 5, further comprising displaying the average I/O command completion time and bucket counts for each logical drive.

15. The method as recited in claim 14, further comprising polling hosts from a single location utilizing an I/O controller management suite to obtain and display the average I/O command completion time and bucket counts for each logical drive.

16. In a host computer couplable to a target over a Storage Area Network (SAN), one or more host processors programmed for continuously providing Input/Output completion information for a particular logical drive at a target by performing the steps of:

timestamping an I/O command destined for the particular logical drive with a first time prior to transmission of the I/O command across the SAN;
recording a second time when an I/O completion is received from the SAN;
calculating an I/O command completion time by computing a time difference between the first time and the second time;
determining a particular range of time that the calculated I/O command completion time falls within;
identifying a bucket representing the particular range of time from a plurality of buckets associated with the particular logical drive each bucket representing a unique range of time and containing a count of I/O commands destined for the particular logical drive that are completed within the range of time represented by the bucket;
incrementing the count of I/O commands within the identified bucket;
calculating an average I/O command completion time for the particular logical drive based on the plurality of buckets and counts contained therein; and
increasing or decreasing a number of outstanding I/O commands associated with the particular logical drive based on the calculated average I/O command completion time as compared to a pre-determined threshold.

17. The one or more host processors as recited in claim 16, wherein the step of calculating an average I/O command completion time for the particular logical drive further comprises:
multiplying an average of the range of time represented by each bucket associated with the logical drive by the count within each bucket to generate a first product;
summing the first products for each bucket to generate a first sum;
summing the counts within each bucket to generate a second sum; and
dividing the first sum by the second sum.

18. The one or more host processors as recited in claim 16, wherein the one or more host processors are programmed at a lower transport protocol driver layer for determining the I/O command completion time for the I/O command destined for the particular logical drive at the target.

19. The one or more host processors as recited in claim 17, further programmed for:
sending the bucket counts to a higher layer; and
calculating the average I/O command completion time at the higher layer.

20. The one or more host processors as recited in claim 16, further programmed for determining the I/O command completion time and the average I/O command completion time for I/O commands destined for any logical drive in a target.

21. The one or more host processors as recited in claim 20, further programmed for automatically decreasing a number of allowable outstanding I/O commands to each logical drive in a target upon detecting that the average I/O completion time for any logical drive in that target has reached an upper limit.

22. The one or more host processors as recited in claim 21, further programmed for decreasing the number of allowable outstanding I/O commands to each logical drive by decreasing a queue depth for each logical drive.

23. The one or more host processors as recited in claim 21, further programmed for decreasing the number of allowable outstanding I/O commands to each logical drive by a configurable amount.

24. The one or more host processors as recited in claim 23, further programmed for automatically repeatedly decreasing the number of allowable outstanding I/O commands by the configurable amount until the average I/O completion time for the logical drive in the target that had reached the upper limit decreases.

25. The one or more host processors as recited in claim 24, further programmed for ensuring that the number of allowable outstanding I/O commands to each logical drive is not decreased below a configurable non-zero lower limit.

26. The one or more host processors as recited in claim 21, further programmed for automatically increasing the number of allowable outstanding I/O commands to each logical drive in the target upon detecting that the average I/O completion time for any logical drive in that target has decreased to a particular threshold.

27. The one or more host processors as recited in claim 26, further programmed for increasing the number of allowable outstanding I/O commands to each logical drive in configurable steps.

28. The one or more host processors as recited in claim 16, further programmed for embedding the first time into a transport protocol command.

29. The one or more host processors as recited in claim 20, further programmed for displaying the average I/O command completion time and bucket counts for each logical drive.

30. The one or more host processors as recited in claim 29, further programmed for polling hosts from a single location utilizing an I/O controller management suite to obtain and display the average I/O command completion time and bucket counts for each logical drive.

31. A host computer comprising the one or more host processors as recited in claim 16.

32. A SAN comprising the host computer as recited in claim 31.

33. One or more storage systems including a computer program which, when executed by one or more host processors in a host couplable to a target over a Storage Area Network (SAN), continuously provides Input/Output (I/O) information for a particular logical drive at the target by causing the one or more host processors to perform the steps of:
   timestamping an I/O command destined for the particular logical drive with a first time prior to transmission of the I/O command across the SAN;
   recording a second time when an I/O completion is received from the SAN;
   calculating an I/O command completion time by computing a time difference between the first time and the second time;
   determining a particular range of time that the calculated I/O command completion time falls within;
   identifying a bucket representing the particular range of time from a plurality of buckets associated with the particular logical drive each bucket representing a unique range of time and containing a count of I/O commands destined for the particular logical drive that are completed within the range of time represented by the bucket;
   incrementing the count of I/O commands within the identified bucket;
   calculating an average I/O command completion time for the particular logical drive based on the plurality of buckets and counts contained therein; and
   increasing or decreasing a number of outstanding I/O commands associated with the particular logical drive based on the calculated average I/O command completion time as compared to a pre-determined threshold.

34. The one or more storage systems as recited in claim 33, wherein the step of calculating an average I/O command completion time for the particular logical drive further comprises:
   multiplying an average of the range of time represented by each bucket associated with the logical drive by the count within each bucket to generate a first product;
   summing the first products for each bucket to generate a first sum;
   summing the counts within each bucket to generate a second sum; and
   dividing the first sum by the second sum.

35. The one or more storage systems as recited in claim 33, wherein the computer program is executed by the one or more host processors at a lower transport protocol driver layer.

36. The one or more storage systems as recited in claim 34, wherein the computer program, when executed by the one or more host processors, further causes the one or more host processors to perform the steps of:
   sending the bucket counts to a higher layer; and
   calculating the average I/O command completion time at the higher layer.

37. The one or more storage systems as recited in claim 33, wherein the computer program, when executed by the one or more host processors, further causes the one or more host processors to perform the step of determining the I/O command completion time and the average I/O command completion time for I/O commands destined for any logical drive in a target.

38. The one or more storage systems as recited in claim 37, wherein the computer program, when executed by the one or more host processors, further causes the one or more host processors to perform the step of automatically decreasing a number of allowable outstanding I/O commands to each logical drive in a target upon detecting that the average I/O completion time for any logical drive in that target has reached an upper limit.

39. The one or more storage systems as recited in claim 38, wherein the computer program, when executed by the one or more host processors, further causes the one or more host processors to perform the step of decreasing the number of allowable outstanding I/O commands to each logical drive by decreasing a queue depth for each logical drive.

40. The one or more storage systems as recited in claim 38, wherein the computer program, when executed by the one or more host processors, further causes the one or more host processors to perform the step of decreasing the number of allowable outstanding I/O commands to each logical drive by a configurable amount.

41. The one or more storage systems as recited in claim 40, wherein the computer program, when executed by the one or more host processors, further causes the one or more host processors to perform the step of automatically repeatedly decreasing the number of allowable outstanding I/O commands by the configurable amount until the average I/O completion time for the logical drive in the target that had reached the upper limit decreases.

42. The one or more storage systems as recited in claim 41, wherein the computer program, when executed by the one or more host processors, further causes the one or more host processors to perform the step of ensuring that the number of allowable outstanding I/O commands to each logical drive is not decreased below a configurable non-zero lower limit.

43. The one or more storage systems as recited in claim 38, wherein the computer program, when executed by the one or more host processors, further causes the one or more host processors to perform the step of automatically increasing the number of allowable outstanding I/O commands to each logical drive in the target upon detecting that the average I/O completion time for any logical drive in that target has decreased to a particular threshold.

44. The one or more storage systems as recited in claim 43, wherein the computer program, when executed by the one or more host processors, further causes the one or more host processors to perform the step of increasing the number of allowable outstanding I/O commands to each logical drive in configurable steps.

45. The one or more storage systems as recited in claim 33, wherein the computer program, when executed by the one or more host processors, further causes the one or more host processors to perform the step of embedding the first time into a transport protocol command.

46. The one or more storage systems as recited in claim 37, wherein the computer program, when executed by the one or more host processors, further causes the one or more host processors to perform the step of displaying the average I/O command completion time and bucket counts for each logical drive.

47. The one or more storage systems as recited in claim 46, wherein the computer program, when executed by the one or more host processors, further causes the one or more host processors to perform the step of polling hosts from a single location utilizing an I/O controller management suite to obtain and display the average I/O command completion time and bucket counts for each logical drive.

* * * * *